US005552040A

United States Patent [19]
Baehler et al.

[11] Patent Number: 5,552,040
[45] Date of Patent: Sep. 3, 1996

[54] METHOD OF INCREASING SERVICE LIFE OF OIL AND A FILTER FOR USE THEREWITH

[75] Inventors: Thomas W. Baehler, Rockford; Henry R. Vanderzyden, Byron; Kenneth N. Baker, Rockford, all of Ill.

[73] Assignee: Sundstrand Corporation, Rockford, Ill.

[21] Appl. No.: 359,266

[22] Filed: Dec. 19, 1994

Related U.S. Application Data

[63] Continuation-in-part of Ser. No. 277,931, Jul. 20, 1994, Pat. No. 5,435,912, which is a continuation of Ser. No. 951,492, Sep. 24, 1992, Pat. No. 5,374,354.

[51] Int. Cl.$^6$ .............................. B01D 37/02; B01D 27/06
[52] U.S. Cl. ..................... 210/168; 210/209; 210/437; 210/490; 210/493.5; 210/501; 210/506
[58] Field of Search .................................. 210/777, 209, 210/501, 506, 488, 489, 490, 416.5, 493.5, 437, 171, 168; 74/467 R; 60/39.08

[56] References Cited

U.S. PATENT DOCUMENTS

| | | | |
|---|---|---|---|
| 2,349,469 | 5/1944 | Sloan | 210/204 |
| 2,392,901 | 1/1946 | Brown | 210/187 |
| 2,395,449 | 2/1946 | Briggs | 210/204 |
| 2,785,805 | 3/1957 | Hough | 210/169 |
| 2,889,338 | 6/1959 | Dazzi | 260/348 |
| 3,224,592 | 12/1965 | Burns et al. | 210/493 |
| 3,376,979 | 4/1968 | Bair | 210/457 |
| 3,397,793 | 8/1968 | MacDonnell | 210/457 |
| 3,570,675 | 3/1971 | Pall et al. | 210/457 |
| 3,592,767 | 7/1971 | Pall | 210/490 |
| 3,618,784 | 11/1971 | Hellmuth et al. | 210/493 |
| 3,715,037 | 2/1973 | Shin-en Hu et al. | 210/501 |
| 3,941,709 | 3/1976 | Herber et al. | 252/78 |
| 3,969,254 | 7/1976 | Herber et al. | 252/78 |
| 3,976,585 | 8/1976 | Herber et al. | 454/538 |
| 4,046,697 | 9/1977 | Briggs et al. | 210/457 |
| 4,104,170 | 8/1978 | Nedza | 210/487 |
| 4,189,388 | 2/1980 | Yaffe et al. | 252/46.7 |
| 4,226,732 | 10/1980 | Reinhard et al. | 252/32.5 |
| 4,290,889 | 9/1981 | Erickson | 210/484 |
| 4,461,713 | 7/1984 | Anzenberger, Sr. | 252/49.9 |
| 4,568,474 | 2/1986 | Theodore et al. | 252/52 R |
| 4,751,901 | 6/1988 | Moor | 123/196 A |
| 4,886,599 | 12/1989 | Bachmann et al. | 210/287 |
| 4,943,383 | 7/1990 | Avery et al. | 252/52 A |
| 5,015,381 | 5/1991 | Ellion et al. | 210/490 |
| 5,374,354 | 12/1994 | Baehler et al. | 210/168 |

*Primary Examiner*—Neil McCarthy
*Attorney, Agent, or Firm*—Jeffery J. Makeever

[57] ABSTRACT

A method of increasing service life of an oil comprises placing a quantity of oil within a circuit, and placing a filter in the circuit, the filter having surfaces including interstices which contain a quantity of a liquid additive at a time of placement in the circuit, the additive being washed from the interstices of the filter into solution with the oil during filling and operation of the circuit to form a mixture of the oil and additive which reduces the formation of metallo-organic soaps. The oil may be an synthetic ester based oil or a mineral oil. The additive either reacts with an organic acid formed from hydrolysis of the oil during operation of the circuit to neutralize the acid, or alternatively the additive coats metallic wear particles formed during operation of the circuit so that organic acids formed from hydrolysis of the oil during operation of the circuit cannot attach thereto. A filter in accordance with the instant invention comprises an input for receiving oil and an output for discharging oil, and an element through which oil flows from the input to the output with the element having surfaces including interstices which contain a quantity of liquid additive at a time of placement in the circuit, the quantity of liquid additive being washed from the interstices of the filter into solution with the oil during filling and operation of an oil circuit to form a mixture of the oil and additive which reduces the formation of metallo-organic soaps.

27 Claims, 4 Drawing Sheets

METHOD OF INCREASING SERVICE LIFE OF OIL AND A FILTER FOR USE THEREWITH

This is a Continuation-in-Part of U.S. application Ser. No. 08/277,931, filed Jul. 20, 1994, now U.S. Pat. No. 5,435,912 which is a continuation of U.S. application Ser. No. 07/951,492, filed Sep. 24, 1992.

FIELD OF THE INVENTION

The present invention relates to filtration and servicing of oil by a filter in an oil circuit and more particularly to extending the service life of the oil and filter by providing a filter having interstices wetted at a time of placement into the oil circuit with an additive which reduces the formation of metallo-organic soaps.

BACKGROUND ART

The Assignee of the present invention manufactures constant speed drives (CSDs) and integrated drive generators (IDGs) for use in generating 400 Hz. three-phase alternating current in airframes. FIGS. 1 and 2 illustrate conceptually a block diagram of a CSD or IDG of the type manufactured by the Assignee of the present invention. With reference to FIGS. 1 and 2 in which like parts are identified by like reference numerals, a variable speed power take-off 10 is driven by an airframe propulsion engine which varies in speed in direct proportion to the speed of the propulsion engine. When the unit of FIGS. 1 and 2 is an IDG, the power takeoff 10 drives a hydromechanical transmission 18 comprised of a hydraulic pump and motor (not illustrated) contained within the case 12. The transmission adds or subtracts shaft RPM from the power take-off 10 to produce a constant velocity output on shaft 20 which drives a three-phase generator 22 at a constant velocity to produce 400 Hz. three-phase alternating current. When the unit of FIGS. 1 and 2 is a CSD, the input drives a hydromechanical transmission within the case 12 (not illustrated) comprised of a hydraulic pump and motor (not illustrated) to produce a constant velocity output on shaft 14 which drives a three phase generator 16 at a constant velocity to produce 400 Hz. three phase alternating current. An IDG differs from the CSD in that the constant speed drive transmission 18, constant speed shaft output 20 and three-phase generator 22 are each contained within the case 12 instead of the generator 16 of the CSD being external of the case 12 of the transmission. The overall function of a CSD and an IDG is to perform the identical function of generating three-phase 400 Hz. electrical power in an airframe.

New IDGs operate at elevated temperatures. Ester based synthetic oils are used for hydraulic power, cooling, and lubrication in a CSD or an IDG. New airframes have IDGs which produce a high electrical power output requiring the IDG to dissipate heat as a consequence of losses in the constant speed drive transmission and the generator. Additionally, many industrial applications, such as mobile hydraulic systems and industrial gears, for example, utilize mineral oils for lubrication and cooling as well as for working fluid. In all these types of systems, tiny metallic wear particles are formed through the normal operation of the transmissions, gears, hydraulic cylinders, etc. These wear particles are then carried by the oil within the oil circuit. Although some of the wear particles are filtered out of the circuit by the oil filter, many of these wear particles are so small that they are not filtered out by the oil filter. These tiny wear particles are simply carried in suspension by the oil without effect to the operating system.

The operation with either synthetic ester based oils or mineral oils, however, causes the formation of organic acids through the process of hydrolysis. This process occurs at all operating temperatures, but is accelerated at elevated temperatures. A chemical reaction then occurs with these organic acids and the tiny metallic wear particles within the oil circuit to form a metallo-organic soap and/or insoluble products which circulate within the oil contained within the circuit. Unlike the very small wear particles which may be carded in suspension without effect, the metallo-organic soap particles have side chains which bond to other metallo-organic soap particles forming large aggregations which then become trapped in and occlude the interstices of the filter, thereby shortening the service life of both the oil and filter. This process occurs in systems which utilize synthetic ester based oils as well as in systems utilizing mineral oils.

To help illustrate this problem and the application of the following invention, the following discussion will center on an aerospace system which realizes the formation of metallo-organic soaps through the reaction of organic acids with the metallic wear particles. However, the following is to be taken as an exemplary system only, and in no way should this exemplary system be read as the only system to which the invention may be applied. Indeed, the instant invention is applicable to any system which contains a source of metallic wear particles in the oil circuit including, but not limited to, aerospace and industrial applications which utilize either synthetic or mineral oils for lubrication, cooling, or as a working fluid.

The CSD or IDG as illustrated in FIG. 1 contains an oil circuit 24 which contains a filter 26 external to the case or internal to the case as illustrated in FIG. 2. The oil circuit 24 containing the filter 26 cools and cleans the oil within the CSD or IDG. The oil circuit 24 additionally includes an oil pump 28 which scavenges oil within the case 12 to pump the oil 30 to the filter 26 where the oil is filtered to remove entailed solids. The output of the filter 26 is applied to an oil cooler 28 which dissipates the heat picked up by the oil from operation of the hydraulic pump and motor and gearing contained within the transmission of the CSD and the hydraulic pump and motor plus electric generator of the IDG.

The reaction of the lubricants to form organic acids in the oil 30 contained within the case 12 causes the metallo-organic soaps and/or the insoluble products to plug the filter 26 in a relatively short time of operation of the transmission such as 300 to 750 hours as described above. Some aircraft have a specification of a minimum time of 1,200 hours between change of the filter 26 and the oil 30 which is not met by use of oils which are approved generally for airframe applications such as, for example, MIL-L-23699 and MIL-L-7808.

The aforementioned oils, as well as many mineral oils for use in industrial or ground and sea based applications, do not contain adequate additives to prevent the formation of metallo-organic soaps and/or solids which cause the filter to become plugged or otherwise not fully operational requiring replacement sooner than its specified service life. The specifications of many of these oils do not require sale with additives especially suited for preventing the formation of metallo-organic soaps and/or solids. In the aerospace industry, for example, a consequence of the overall relatively small quantity of oil which is sold for use in the CSD or IDG transmissions, is that no manufacturer of oil has been willing to conduct the necessary tests to obtain approval of an oil containing adequate additives for preventing the formation of the aforementioned metallo-organic soaps and solids to permit the filter and oil to be used for their specified service life. The currently available oils break down into organic acids through hydrolysis that chemically attack the wear particles and the metal casing 12 of the CSD or IDG. Formulating new or revised oils that will not form organic acids and/or attack the wear particles or CSD or IDG metal casing would require extensive field/flight evaluations with approval taking from two to eight years with the norm being around six years. The Assignee has requested oil companies to develop a specific IDG/CSD oil for eleven years without obtaining any interest on the part of oil companies to do so.

Liquid oil additives are known which may be mixed with oils to neutralize acids. For example, see U.S. Pat. Nos. 2,889,338, 3,941,709, 3,969,254, 3,976,585, 4,189,388, 4,226,732, 4,461,713, 4,568,474 and 4,943,383. Additionally, metal deactivating compounds are known which may be mixed with oils to provide thin layer coating of the metallic wear particles to insulate them from attack from the organic acids.

Servicing of an oil circuit includes regular oil and filter changes. Those regular oil and filter changes include changing the filter 26 and draining the oil 30 from the case 12. For the exemplary system described above, an airplane mechanic places a new filter in the CSD or IDG and fills the case with new oil 30. As a consequence of the problem involving formation of metallo-organic soaps and/or insoluble solids, the recommended service intervals are so short as to cause airlines to want to have longer service intervals between routine oil and filter changes to lessen the overall operational costs of CSDs or IDGs. The servicing of an oil circuit for other applications is similar to this exemplary system, as is the desire to reduce overall operational costs of operation by having longer service intervals.

In the aerospace industry for example, the airlines desire an oil filter which provides longer service intervals such as up to 3,000 hours in order to lessen the operational cost of the CSD or IDG. A filter having a service life of 3,000 hours is currently not available as a result of the problems of the prior art discussed above. Additionally, such an oil filter which provides longer service intervals is desirable in industrial and other ground based applications as well.

FIGS. 3 and 4 illustrate a prior art oil filter of the type illustrated in FIGS. 1 and 2. The oil filter 26 has an end cap 40 which has an outlet for discharging oil pumped under pressure by the oil pump 28. An O-ring seal 42 provides suitable sealing between a fitting mating with the end cap 40. Oil flows into the cylindrical chamber 44 within the filter 26 by flow radially inward through a pleated filtering media 46 as described below, an inner perforated cylindrical support tube 50 having apertures 52. The pleated filtering media 46 surrounds the inner perforated support tube 50 and prevents radially inward deflection of the filtering media 46 caused by radial inward flow of pressurized oil. The pleated filtering media 46 contains interstices for trapping solid particles flowing within the oil. Oil flows inward through the filtering media 46, inner perforated support tube 50 and from the outlet at the end cap 40 to the oil circuit 24. The filtering media 46 and inner support tube 50 are glued to end cap 54 by a suitable adhesive such as epoxy glue. Similarly, end cap 40 is attached to the filtering media 46 and inner support tube 50 by epoxy glue.

The filtering media 46 is comprised of a sandwich of four (more or less depending on specific construction) pleated layers illustrated in FIG. 3 and in detail in FIG. 4. The media 46 is formed into a cylinder 56 with pleats 58 extending longitudinally along the length of the filter. The cylinder 56 completely encircles the cylindrical chamber 44. The inner layer 60 (with reference to the cylindrical chamber 44) is an aluminum, stainless, or other metal type screen. A first intermediate layer 62, which is a nylon or polyester scrim, contacts the inner layer 60. A second intermediate layer 64, which is a fiberglass filtering media, contacts the nylon or polyester scrim 62. The outer layer 66, which is an aluminum, stainless steel or other metal type screen, contacts the fiberglass filtering media 64. The thickness and surface area of the filtering media determine the filtration produced by the filter 26. The aforementioned metallo-organic soaps and/or solids occlude the interstices of the filter.

In the prior art, the filter 26 is packaged dry within a suitable package for preventing its exposure to dirt. The mechanic removes the filter 26 from the package and places it within the oil filtration circuit 24 while the filter 26 is dry. No additives are contained within the filter in the prior art. Oil is added to the case 12 during changing of the oil or to top off the case between oil changes.

U.S. Pat. Nos. 2,392,901, 2,785,805, 3,224,592, 4,751,901, and 4,886,599 each disclose filters which have been coated with solids or additive packages to neutralize the formation of acids within the oil being filtered or to replace the additives which are already included within the oil. None of the aforementioned patents, however, suggest the usage of a liquid additive which wets the interstices of the filter prior to use with a quantity of liquid additive that is washed from the interstices into solution with the oil during filtration by the filter to form a mixture of the oil and additive which reduces the formation of metallo-organic soaps and solids that are retained within the interstices of the filter.

SUMMARY OF THE INVENTION

The present invention is a method of increasing service life of an oil and an improved filter having interstices and other surfaces of the filter wetted prior to placement in an oil circuit with a quantity of a liquid oil additive that is washed from the interstices and surfaces of the filter into solution with the oil during filling or operation of the circuit to form a mixture of the oil and additive which reduces the formation of substances that are retained in the interstices of the filter which shorten the service life of the oil and/or the filter. The additive lessens pressure drop of the oil through the filter during operation by reducing the formation of substances which form from reaction of the oil, as described above, that occlude the filter when compared to the operation of the transmission without addition of the additive. The liquid additive may be in accordance with the aforementioned patents or contain an epoxide ring which acts to neutralize organic acids. Alternatively, the liquid additive may be of a phosphate chemistry which coats the wear particles and prevents the acid from attaching thereto. As used herein, the term "occluding substance" means any substance which is a product of a reaction of the oil within any part of the circuit during operation to produce anything which occludes the filtering media of an oil filter to shorten a service life of the oil and/or the filter including, but not limited to, metallo-organic soaps or solids as described above.

The epoxide reacts with the organic acid, which is formed from hydrolysis of the oil, to reduce acid formation. As a result, the organic acid is reduced and prevents reactions with the metallic wear particles, metallic case material, and other metals in the system tending to form an occluding substance. Alternatively, the phosphate reacts with the metallic wear particles themselves and provides a thin layer coating which prohibits the organic acid formed from hydrolysis of the oil from attacking these wear particles. The coating thickness is controlled by the additive chemistry, and contains side chains which are not reactive, as opposed to the side chains of organic acids which do link together or aggregate to form large metallo-organic soap particles which occlude the interstices of the filter. The prior art problem of forming occluding substances, such as insoluble metallo-organic soaps and other products which plug the filters, is eliminated. As a result, both extended oil and filter life are possible. The additive may be in accordance with the prior art discussed above or include a monofunction or multifunctional epoxide group per molecule which may be at the end of the chain or within the chain. Alternatively, the additive may be of the family of metal deactivators having a phosphate based chemistry. The quantity of the additive should be sufficient to prevent the aforementioned reactions and may be from 0.4 to 25% of the weight of the final oil blend and preferably may be from 0.4 to 5.0% of the quantity of the oil mixture in the circuit.

The surface area and thickness of the filtering media substantially affect the quantity of additive which may be retained by the filter. An increase in the quantity of additive retained in the filter in comparison with the quantity which may be retained with a standard commercially available filter may be produced by increasing the surface area and/or thickness of the filtering media or by adding additional filtering media to the original filtering media or material wettable with the additive to the filter. The additional filtering media or wettable material may have filtration properties different than the material from which the original filtering media is manufactured.

A method of increasing service life of an oil and filter in accordance with the invention includes placing a quantity of oil within an oil circuit to provide clean oil within the circuit; and placing the filter in the oil circuit, the filter having surfaces including interstices wetted prior to placement in the oil circuit with a quantity of liquid additive that is washed from the interstices of the filter into solution with the oil during filling and/or operation of the circuit to form a mixture of the oil and additive which reduces the formation of occluding substances that are retained in the interstices of the filter. The quantity of oil additive is preferably between 0.4 and 5.0% of the quantity of the mixture of oil and additive in the circuit. In a preferred embodiment, the additive reacts with organic acids formed from hydrolysis of the oil during operation reducing the formation of occluding substances. The oil may be either ester based synthetic or mineral oil. The additive may contain at least one epoxide group per molecule, or may alternatively be a metal deactivator having a phosphate chemistry which coats metallic wear particles within the oil circuit, preventing the organic acids formed by hydrolysis of the oil during operation from attacking the wear particles and forming the occluding substances.

The filter used in the method of increasing service life comprises a first filtering media which is wettable with additive and which filters oil passing through the filter to perform a majority of filtering of the oil during operation of the transmission and a second filtering media which is wetted with additive and which filters oil passing through the filter with the second filtering media performing a minority of the filtering of the oil during operation. The filter may include a cylinder containing pleats containing a filtering media which functions to filter oil passing through the cylinder; and a surface coating disposed on the pleats which is wettable by the additive for increasing an amount of the additive with which the filter is wetted when compared to an amount of additive which the filter could be wetted without the surface coating. The pleats have a plurality of layers including the filtering media and at least one of the layers is coated with the surface coating. Alternatively, the filter comprises a first cylinder containing pleats containing a filtering media which function to filter oil passing through the first cylinder; and a second cylinder having material which is wettable by the additive for increasing an amount of additive with which the filter could be wetted when compared to an amount of additive which the filter could be wetted without the second cylinder. The second cylinder may be disposed outside the first cylinder or inside the first cylinder. Additionally, material may be disposed between the pleats of the first cylinder and an inner diameter of the second cylinder which is wettable by the additive for increasing an amount of the additive with which the filter could be wetted when compared to an amount of additive which the filter could be wetted without the material disposed between the pleats of the first cylinder and the inner diameter of the second cylinder. The additional additive wetted surface coating may comprise a filtering material contained in the filtering media or a filtering material different than a filtering material contained in the other filtering media.

An oil filter for use in an oil circuit in accordance with the invention includes an input for receiving oil flowing in the circuit during operation of the oil circuit and an output for discharging filtered oil; and a filter element through which oil flows from the input to the output with the filter element having surfaces including interstices which are wetted with a quantity of liquid oil additive prior to placement in the oil circuit that is washed from the surfaces and interstices of the filter into solution with the oil during filling and/or operation of the circuit to form a mixture of the oil and additive which reduces the formation of occluding substances that are retained in the interstices of the filter. The quantity of the additive is preferably between 0.4 and 5.0% of the quantity of the mixture in the circuit. In one embodiment of the instant invention, the additive reacts with an organic acid formed from hydrolysis of the oil during operation to neutralize the acid thereby preventing formation of metallo-organic soaps and solids. The additive may contain at least one epoxide group per molecule. In an alternate embodiment of the instant invention, the additive is a metal deactivator having a phosphate chemistry which coats metallic wear particles within the oil circuit, preventing the organic acids formed by hydrolysis of the oil during operation from attacking the wear particles and forming the occluding substances. The oil may be an ester based synthetic or a mineral oil.

The filter element of the filter of the present invention includes a first filtering media which is wetted with additive and which filters oil passing through the filter to perform a minority or majority of filtering of the oil during operation of the transmission; and a second filtering media which is wetted with additive and which filters oil passing through the filter with the second filtering media performing a minority or majority of filtering of oil during operation of the transmission. The filtering element comprises a cylinder containing pleats containing a filtering media which functions to filter oil passing through the cylinder and an additional layer disposed in contact with the pleats which is wettable by the additive for increasing an amount of the additive with which the filter element could be wetted when compared to an amount of additive which the filter element could be wetted without the additional layer. The pleats have a plurality of layers, including the filtering media, and at least one of the layers is coated with the additional layer. Alternatively, the filter element comprises a first cylinder containing pleats containing a filtering media which function to filter oil passing through the first cylinder; and a second cylinder having material which is wettable by the additive for increasing an amount of additive with which the filter element could be wetted when compared to an amount of additive which the filter element could be wetted without the second cylinder. The second cylinder may be disposed outside the first cylinder or inside the first cylinder. Furthermore, the filter of the present invention includes material disposed between the pleats of the first cylinder and an inner diameter of the second cylinder which is wetted by the additive for increasing an amount of the additive with which the filter element could be wetted when compared to an amount of additive which the filter element could be wetted without the material disposed between the pleats of the first cylinder and the inner diameter of the second cylinder. The surface coating may comprise a filtering material contained in the filtering media or a filtering material different than a filtering material contained in the filtering media.

DESCRIPTION OF THE PREFERRED EMBODIMENTS

Figure 3:
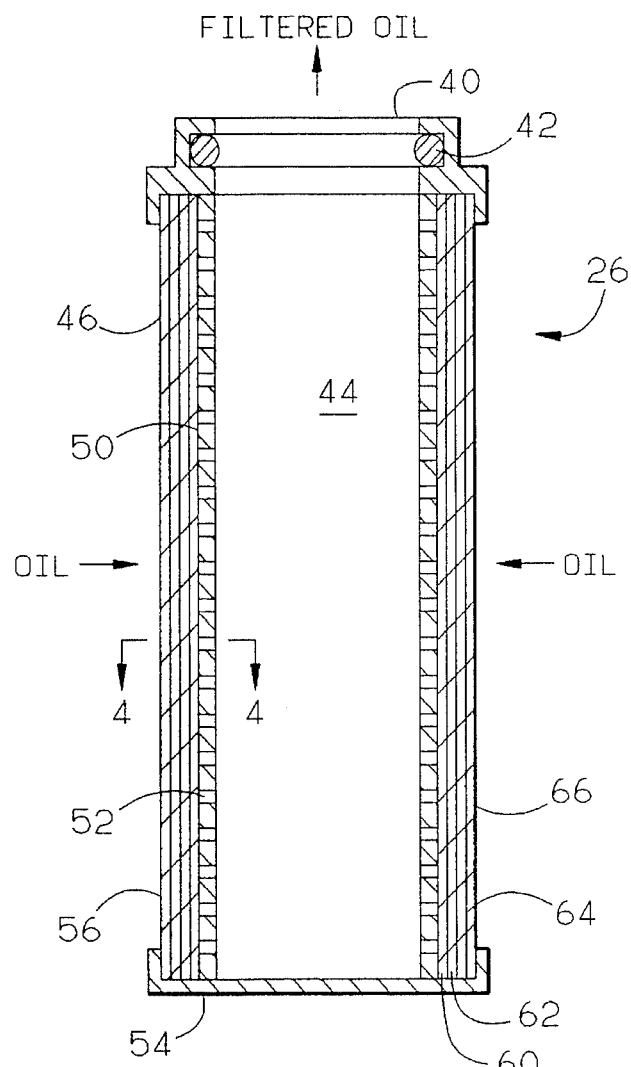
FIG. 3 illustrates a prior art oil filter of the type utilized in CSD or IDG as illustrated in FIGS. 1 or 2.
Figure 4:
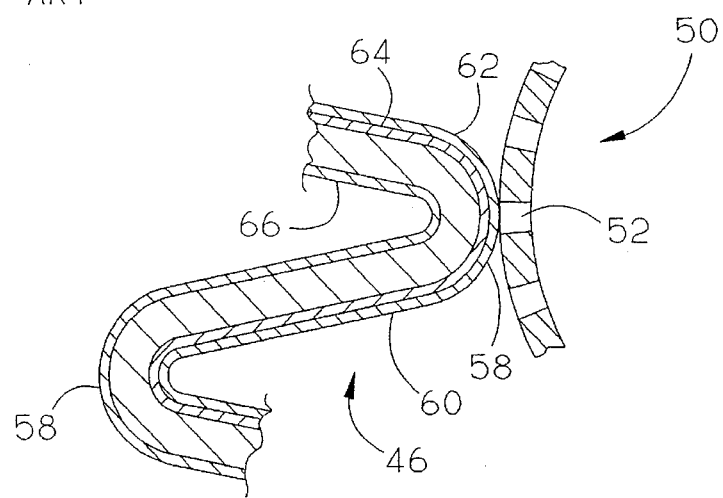
FIG. 4 is a sectional view of FIG. 3 along section lines 4—4.

The method of increasing service life of an oil and a filter in an oil circuit may be practiced using a filter having a structure such as the prior art illustrated in FIGS. 3 and 4 or, alternatively, with a modified filter as illustrated in FIGS. 5–8. Like parts are identified by like reference numerals throughout the drawings.

Figure 1:
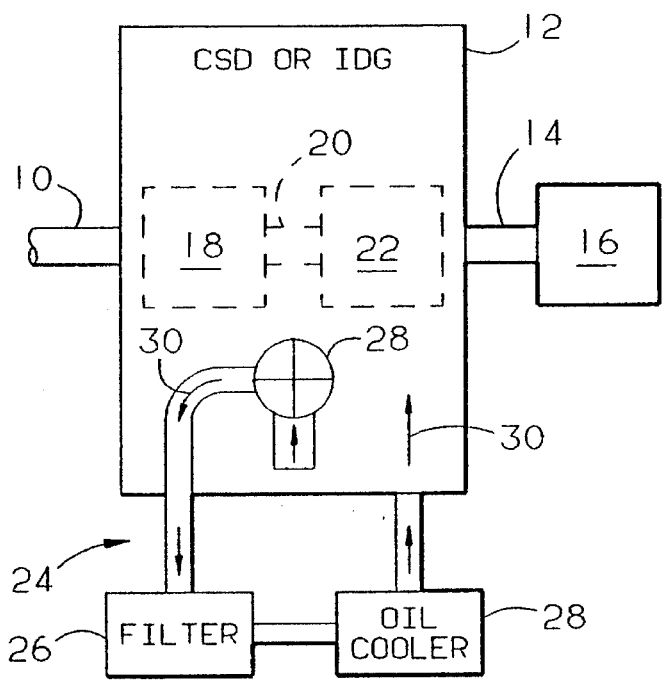
FIG. 1 illustrates a conceptual diagram of a prior art CSD or IDG of the type manufactured by the Assignee of the present invention in which an oil filter is mounted external to a case of the CSD or IDG.
Figure 2:
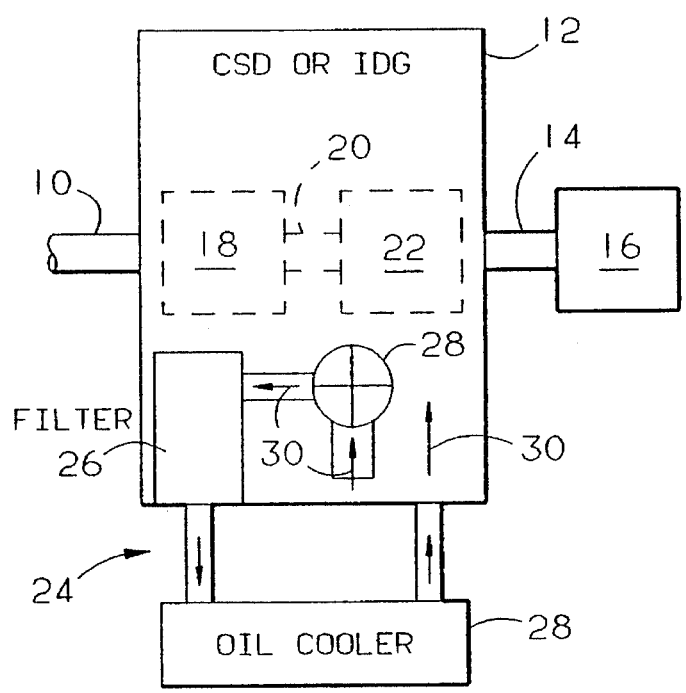
FIG. 2 illustrates a conceptual diagram of a prior art CSD or IDG of the type manufactured by the Assignee of the present invention in which an oil filter is mounted internal to a case of the CSD or IDG.

The present invention differs from the prior art in that the filter which is placed in the oil circuit (for example circuit 24 of FIGS. 1 and 2) which filters the oil during operation has surfaces including the interstices of the filtering media wetted prior to placement in the oil circuit with a quantity of a liquid oil additive that is washed from the interstices of the filter into solution with the oil during operation and/or filling of the circuit to form a mixture of the oil and additive which reacts to reduce the formation of occluding substances, such as metallo-organic soaps and/or solids, that are retained in the interstices of the filter, when compared to operation of the circuit without additive. The quantity of the oil additive is preferably between 0.4 and 5.0% of the total quantity of the mixture of oil and additive. In an exemplary system suitable for the instant invention as illustrated in FIGS. 1 and 2, the case 12 of the transmission is typically drained prior to placing new oil within the case and further has oil added to it from time to time. The quantity of additive should be sufficient to prevent the formation of occluding substances to a degree which require the oil and filter to be changed prior to completion of an airline service specification such as, but not limited to, 3,000 hours of operation without a change of oil and filter. The oil 30 may have a specification which prevents the additive from being packed with the oil and sold in accordance with the specification. While the invention is not limited thereto, the additive reacts with an organic acid formed from hydrolysis of oil during operation of the circuit to neutralize the acid and prevent forming a compound thereby reducing the formation of occluding substances. Alternatively, the additive reacts with metallic wear particles to coat same to prevent the acid from attaching thereto, thereby preventing the formation of occluding substances. Additionally, while not limited thereto, the oil may be ester based or may be mineral oil, and the additive may contain at least one epoxide group per molecule or may be phosphate based.

Placement of the filter 26, containing the aforementioned quantity of additive in the oil circuit 24, is the same as in the prior art. As a consequence of the surfaces of the filter including interstices of the filter being wetted with the quantity of additive sufficient to reduce the aforementioned deleterious formation of occluding substances, such as metallo-organic soaps and solids, the servicing of, for example, the CSD or IDG may be lengthened considerably from intervals as short as 750 hours, which are currently being encountered with high performance, high power electrical power generating systems utilized in newer airframes, to an interval such as 3,000 hours. The resultant increasing of service life of the oil and filter, which may be up to four times the current service life for high performance electric power generating systems, provides substantial labor and material savings and reduces the overall cost of operation of any system. Furthermore, as a consequence of the wetting of the surfaces including interstices of the filter 26 prior to placement in the oil circuit, the mechanic performing the serving is not required to measure a quantity of additive and furthermore is not required to even consider the addition of the additive as a consequence of it being retained on surfaces of the oil filter including the interstices of the filtering media produced by wetting thereof. As a result, substantial savings are produced for operators by lessening the cost of servicing and further lengthening the overall service intervals without increasing wear on the mechanical components therein. Furthermore if the ester based additives are used, by removing acids within the oil 30, the attack on the metals within the case 12 is substantially reduced which increases the overall reliability over the extended life of the system.

Likewise if the phosphate based additives are used, by coating the tiny metallic wear particles to stop the formation of large aggregations, the overall wear on the mechanical components in the system is substantially reduced.

An improved filter in accordance with the invention has substantially the same structure or additional material or structure for retaining an additional quantity of additive than that which may be retained by a standard oil filter as described above in conjunction with FIGS. 3 and 4. However, the wetting of the surfaces and interstices of the filter with the quantity of additive necessary to reduce the aforementioned deleterious formation of occluding substances, such as metallo-organic soaps and solids, has the benefit of substantially reducing the overall cost of service by extending service life of the filter and oil.

As has been described above, the quantity of additive which is washed from the surfaces of the filter 26, including interstices, should be sufficient to prevent the formation of occluding substances which cause the filter or oil to require change prior to a recommended time interval between servicing. The invention may be practiced by wetting the prior art filter as described above with the additives as described above, preferably as described by U.S. Pat. No. 3,969,254, which causes surfaces of the filter including the multiple layers of the filtering media and interstices to retain sufficient additive to prevent the formation of a sufficient quantity of occluding substances to shorten the lifespan of the filter 26 and oil 30 to be less than the recommended time between service intervals. However, alternatively, the filter of FIG. 4 may be modified to include material for substantially increasing surfaces which retain additional additive to provide an additional quantity of additive which is washed from the surfaces including the interstices of the filter into solution with the oil during filling and operation of the circuit to form a mixture of the oil and additive which reduces the formation of occluding substances that are retained in the interstices of the filter. Different embodiments of additional surfaces and structures for retaining additional additive are described below in conjunction with FIGS. 5–8.

Genetically, a modified filter in accordance with the embodiments of FIGS. 5–8 has a first filtering media as in the prior art, as illustrated in FIGS. 3 and 4, which is wetted with additive and which filters oil passing through the filter to perform a minority or majority of filtering of the oil and additive retention during operation of the transmission and functions like the prior art of FIGS. 3 and 4. This first filtering media may be the second intermediate layer 64 of the prior art filter of FIGS. 3 and 4 as contained in the four-layer sandwich described in conjunction with FIGS. 3 and 4. Additionally, a second filtering media is wetted with additional additive and filters a minority or majority of the oil passing through second media. The second filtering media performs additional filtering of the oil during operation of the transmission than the filtering performed by the first filtering media and is added to the filter to retain additional additive to provide increased ability to prevent the formation of occluding substances. The second filtering media would typically perform a minority of filtering of the oil and retain additional additive which could be a minority or majority of the overall additive depending upon the surface area of the second filtering media. The placement and form of the second filtering media is primarily for the purpose of providing additional surface area and/or interstices which are wetted with additional additive to increase the overall quantity of oil retained within the wetted filter to have a quantity sufficient to prevent the formation of occluding substances throughout the recommended service life of the filter. The material from which the second filtering media is manufactured may be identical to the material used for manufacturing the first filtering media with larger interstices than the first filtering media when the second filtering media performs a minority of filtering of the oil or may be a different material which is highly wettable with the additive and retains a large quantity of additive per unit surface area of the second filtering media. The present invention may be practiced by utilizing different filtering media in accordance with the primary and secondary filtering characteristics described above. The materials from which the first and second filtering media are manufactured may be identical or different and have interstices of different size which determine the quantity of filtering performed by each filtering media. The filtering function performed by the second filtering media is not required to meet the filtration specification of the filter for removing particles from the oil.

Figure 5:
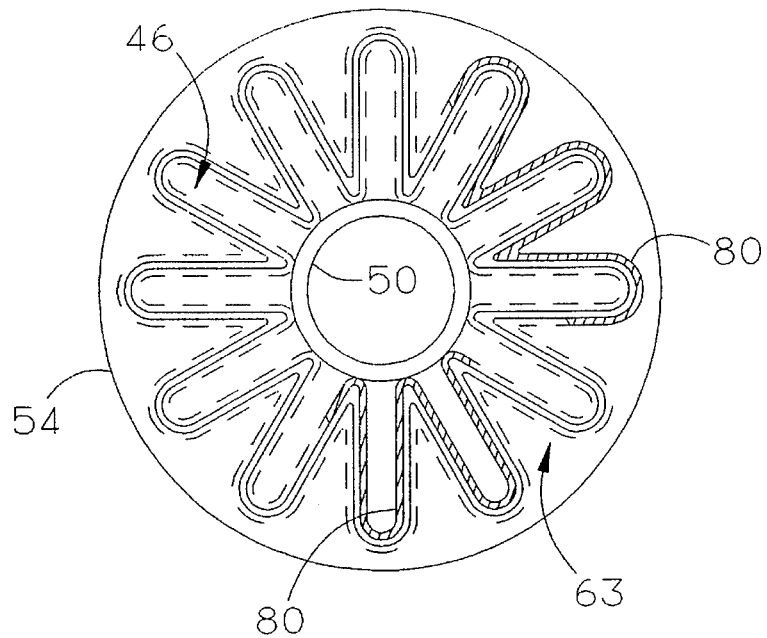
FIG. 5 illustrates a top plan view of a first alternative embodiment of the filter of the invention which contains material increasing an amount of additive retained by the filter.

FIG. 5 illustrates a top plan view of a first alternative embodiment of a filter which may be used in practicing the present invention for increasing an amount of additive which may be retained. The pleats 63 may have a plurality of layers, including the filtering media, as described above in conjunction with FIGS. 3 and 4 with at least one of the layers of the filtering media being coated with an additional layer or surface coating 80 disposed on the pleats which is wettable by the additive for increasing an amount of the additive with which the filter could be wetted when compared to an amount of additive which with the filter could be wetted without the surface coating in accordance with the prior art filter of FIGS. 3 and 4. The detailed construction of the pleats 63 has been omitted from the drawing to avoid complicating the illustration but it should be understood that the pleats may be varied in construction. The surface coating 80 is illustrated as being deposed on either an outside or an outside surface of the pleats 63 but it should be understood, as stated above, that it may be coated on one or more of the layers of the filtering media as described above in conjunction with FIGS. 3 and 4 by any known coating process. The coating 80 performs a minority of filtering of the oil when compared to the filtering media 46. It should be noted that the radial depth of the pleats 63 has been exaggerated when compared to FIG. 3 and is not meant to suggest a necessary scale for practicing the invention to retain additional additive.

Figure 6:
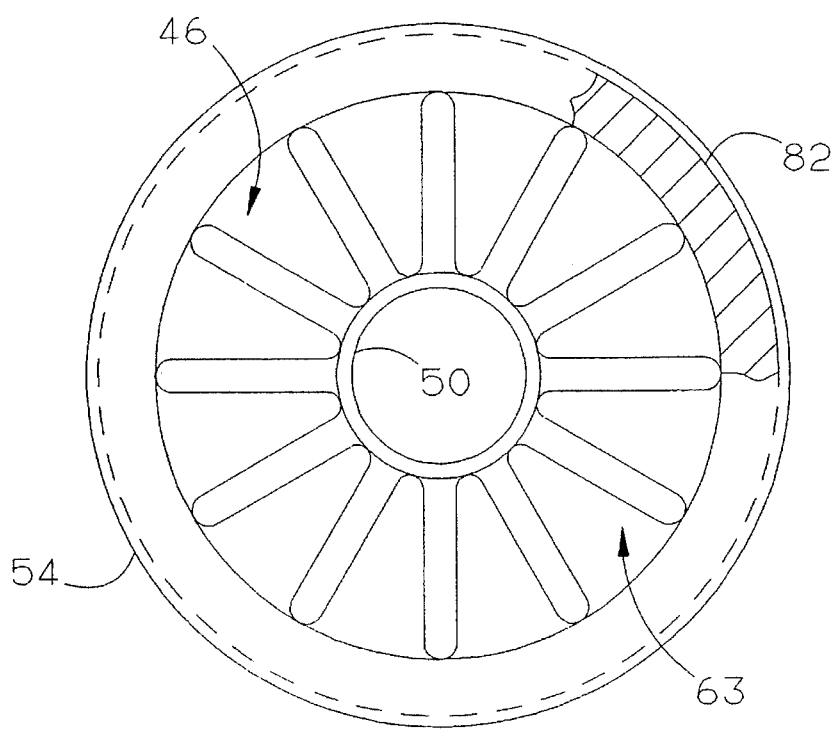
FIG. 6 illustrates a top plan view of a second alternative embodiment of the filter of the invention which contains material increasing an amount of additive retained by the filter.

FIG. 6 illustrates a top plan view of a second alternative embodiment of a filter which may be used in practicing the present invention for increasing an amount of additive which may be retained. The second alternative embodiment of the filter has a first cylinder containing pleats 63 containing a filter media which functions to filter oil passing through the first cylinder identical to that described above in conjunction with FIGS. 3 and 4 and a second outer cylinder 82 disposed outside of the first cylinder having material which is wettable by the additive for increasing an amount of additive with which the filter could be wetted when compared to an mount of additive which the filter could be wetted without the second cylinder. The second cylinder 82 may be manufactured from the filtering material contained in the filtering media within the first cylinder or from a filtering material different than the filtering material contained in the filtering media of the first cylinder. The second cylinder 82 performs a minority of filtering of the oil 30 when compared to the filtering media 46 of the first cylinder. It should be noted that the radial depth of the pleats 63 has been exaggerated when compared to FIG. 3 and is not meant to suggest a necessary scale for practicing the invention to retain additional additive.

Figure 7:
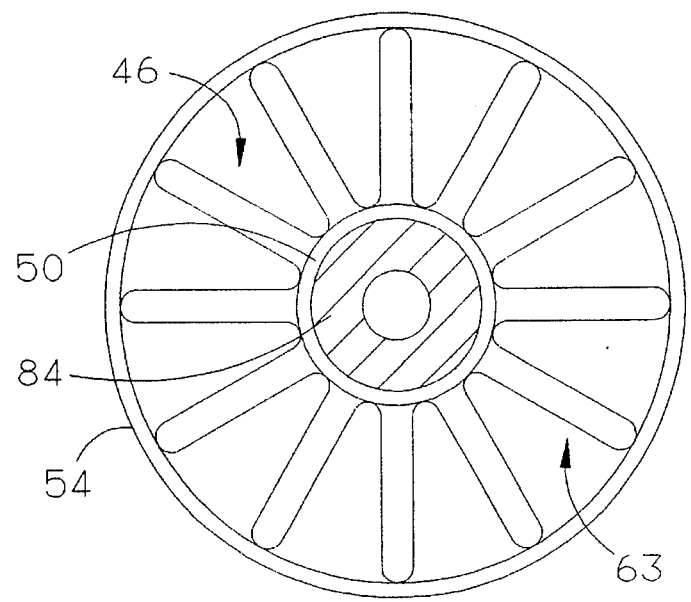
FIG. 7 illustrates a top plan view of a third alternative embodiment of the filter of the invention which contains material increasing an amount of additive retained by the filter.

FIG. 7 illustrates a top plan view of a third alternative embodiment of the filter which may be used in practicing the invention for increasing an amount of additive which may be retained having a second inner cylinder 84 having material which is wettable by the additive for increasing an amount of additive with which the filter could be wetted when compared to an amount of additive which the filter could be wetted without the second cylinder which differs from the second alternative embodiment described above in conjunction with FIG. 6 only in that the second cylinder is disposed inside of the first cylinder. The second cylinder 84 performs a minority of filtering of oil when compared to the filtering media 46. It should be noted that the radial depth of the pleats 63 has been exaggerated when compared to FIG. 3 and is not meant to suggest a necessary scale for practicing the invention to retain additional additive.

Figure 8:
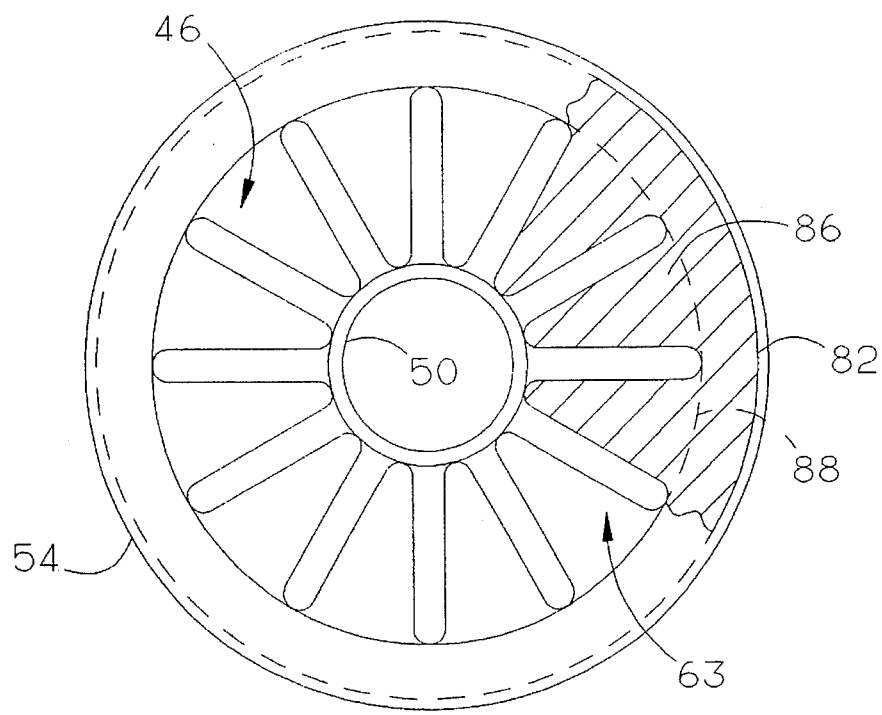
FIG. 8 illustrates a top plan view of a fourth alternative embodiment of the filter of the invention which contains material increasing an amount of additive retained by the filter.

FIG. 8 illustrates a top plan view of a fourth alternative embodiment of a filter which may be used in practicing the invention for increasing an amount of additive which may be retained having an outer cylinder 82 identical to that described above in conjunction with the second embodiment of FIG. 6 containing a material which is wettable by the additive for increasing an amount of additive with which the filter could be wetted when compared to an amount of additive which the filter could be wetted without the second cylinder and further material 86 disposed between the pleats 63 of the first cylinder and an inner diameter 88 of the second cylinder 82 which is wettable by the additive for increasing an amount of the additive with which the filter could be wetted when compared to an amount of additive which the filter could be wetted without the material disposed between the pleats of the first cylinder and the inner diameter of the second cylinder. The second cylinder 82 performs a minority of filtering of oil when compared to the filtering media 46. It should be noted that the radial depth of the pleats 63 has been exaggerated when compared to FIG. 3 and is not meant to suggest a necessary scale for practicing the invention to retain additional additive.

While a preferred application of the present invention is in a constant speed drive transmission within a CSD or IDG utilized in an airframe electrical power generating system, it should be understood that the invention is not limited to application only with this type of system. Moreover, it should be understood that other additives may be used in accordance with the practice of the invention which are not limited to those identified above. Any liquid additive which may be retained in the interstices of the filter and which washes from the filter during operation and/or filling of the transmission to form a mixture of the oil and additive which reduces the formation aforementioned occluding substances may be used in practicing the present invention. Furthermore, the invention is not limited to the use of a filter as described above in conjunction with FIGS. 3–8. Alternatively, different filter and filtering medias may be used to retain the additive in practicing the invention. It is intended that all such modifications of the invention fall within the scope of the appended claims.

We claim:

1. A method of increasing service life of an oil, comprising:

placing a quantity of oil within a circuit; and placing a filter in the circuit, the filter having surfaces including interstices which contain a quantity of a liquid additive at a time of placement in the circuit, the additive being washed from the interstices of the filter into solution with the oil during filling and operation of the circuit to form a mixture of the oil and additive which reduces the formation of metallo-organic soaps.

2. A method in accordance with claim 1 wherein:

the quantity of the additive is between 0.4 and 5.0% of the quantity of the mixture in the circuit.

3. A method in accordance with claim 1 wherein:

the additive reacts with an organic acid formed from hydrolysis of the oil during operation of the circuit to neutralize the acid.

4. A method in accordance with claim 1 wherein the additive coats metallic wear particles formed during operation of the circuit so that organic acids formed from hydrolysis of the oil during operation of the circuit cannot attach thereto.

5. A method in accordance with claim 1 wherein:

the oil is ester based.

6. A method in accordance with claim 1 wherein:

the additive contains at least one epoxide group per molecule.

7. A method in accordance with claim 1 wherein:

the oil is mineral based.

8. A method in accordance with claim 1 wherein:

the additive is a metal deactivator utilizing a phosphate chemistry.

9. A method in accordance with claim 1 wherein:

the oil flows through a filtering media within the filter which functions to filter the oil; and wetting an additional layer disposed in contact with the filtering media with the additive for increasing an amount of the additive with which the filter is wetted when compared to an amount of additive which the filter could be wetted without the additional layer.

10. A method in accordance with claim 9 wherein:

the oil flows through pleats within the filter with the pleats having a plurality of layers including the filtering media.

11. A method in accordance with claim 1 wherein:

oil flows through a first container containing pleats having a filtering media to filter oil passing through the first container; and oil flows through a second container having material which is wetted with the additive prior to the flow of oil for increasing an amount of additive with which the filter could be wetted when compared to an amount of additive which the filter could be wetted without the second container.

12. A method in accordance with claim 11 further comprising:

wetting a material disposed between the pleats of the first container and the second container with the additive prior to oil flow through the filter for increasing an amount of the additive with which the filter could be wetted when compared to an amount of additive which the filter could be wetted without the material disposed between the pleats of the first container and the second container.

13. A method in accordance with claim 1 wherein:

oil flows through a first filtering media which is wetted with additive prior to flow of the oil and which filters oil passing through the filter to perform a majority of filtering of the oil during operation of the circuit; and oil flows through a second filtering media which is wetted with additive prior to flow of the oil and which filters oil passing through the filter with the second filtering media performing a minority of filtering of the oil during operation of the circuit.

14. A filter, comprising:

an input for receiving oil and an output for discharging oil; and an element through which oil flows from the input to the output with the element having surfaces including interstices which contain a quantity of liquid additive at a time of placement in the circuit, the quantity of liquid additive being washed from the interstices of the filter into solution with the oil during filling and operation of an oil circuit to form a mixture of the oil and additive which reduces the formation of metallo-organic soaps.

15. A filter in accordance with claim 14 wherein:

the quantity of the additive is between 0.4 and 5.0% of the quantity of the mixture in the circuit.

16. A filter in accordance with claim 14 wherein:

the additive reacts with an organic acid formed from hydrolysis of the oil during operation of the circuit to neutralize the acid to reduce formation of the occluding substances.

17. A filter in accordance with claim 14 wherein:

the additive coats metallic wear particles formed during operation of the circuit so that organic acids formed from hydrolysis of the oil during operation of the circuit cannot attach thereto.

18. A filter in accordance with claim 14 wherein:

the oil is ester based.

19. A filter in accordance with claim 14, wherein:

the additive contains at least one epoxide group per molecule.

20. A filter in accordance with claim 14 wherein:

the oil is mineral based.

21. A filter in accordance with claim 14 wherein:

the additive utilizes a phosphate chemistry.

22. A filter in accordance with claim 14 wherein the element comprises:

a filtering media which functions to filter oil passing through the element; and a surface coating disposed on the filtering media which is wettable with the additive for increasing an amount of the additive with which the element could be wetted when compared to an amount of additive which the element could be wetted without the surface coating.

23. A filter in accordance with claim 14 wherein the element comprises:

a first container containing a filtering media which function to filter oil passing through the first container; and a second container having material which is wettable with the additive for increasing an amount of additive with which the element could be wetted when compared to an amount of additive which the element could be wetted without the second container.

24. A filter in accordance with claim 23 further comprising:

material disposed between the filtering media of the first container and the second container which is wettable with the additive for increasing an amount of the additive with which the element could be wetted when compared to an amount of additive which the element could be wetted without the material disposed between the filtering media of the first container and the second container.

25. A filter in accordance with claim 14 wherein the element comprises:

a first filtering media which is wetted with additive and which filters oil passing through the filter to perform a majority of filtering of the oil during operation of the circuit; and a second filtering media which is wetted with additive and which filters oil passing through the filter with the second filtering media performing a minority of filtering of the oil during operation of the circuit.

26. A method of increasing service life of a filter in an oil circuit, comprising:

placing a quantity of oil within the circuit; and placing a filter in the circuit, the filter having surfaces including interstices which contain a quantity of liquid additive at a time of placement in the circuit, the quantity of a liquid additive being washed from the interstices of the filter into solution with the oil during filling and operation of the circuit to form a mixture of the oil and additive which reduces the formation of metallo-organic soaps.

27. A filter for use in an oil circuit, comprising:

an input for receiving oil flowing in the circuit during operation of the circuit and an output for discharging filtered oil; and a filter element through which oil flows from the input to the output with the filter element having surfaces including interstices which retain solids in the oil flowing through the oil circuit and contain a quantity of liquid additive at a time of placement in the oil circuit, the quantity of liquid additive being washed from the interstices of the filter into solution with the oil during filling and operation of the oil circuit to form a mixture of the oil and additive which reduces the formation of metallo-organic soaps.

* * * * *